Oct. 17, 1944.   R. L. TIEDE   2,360,373
APPARATUS FOR FEEDING GLASS IN THE MANUFACTURE OF FIBERS
Filed March 29, 1943

Inventor
Ralph L. Tiede,
By Hachin & Overman
Attorneys

Patented Oct. 17, 1944

2,360,373

UNITED STATES PATENT OFFICE 2,360,373

APPARATUS FOR FEEDING GLASS IN THE MANUFACTURE OF FIBERS

Ralph Lester Tiede, Newark, Ohio, assignor to Owens-Corning Fiberglas Corporation, a corporation of Delaware Application March 29, 1943, Serial No. 481,049

11 Claims. (Cl. 13—6)

This invention relates to the art of feeding molten glass and like materials and refers more particularly to improvements of this nature in the manufacture of glass fibers.

One method of manufacturing fibers from glass or like materials is to melt cullet in the form of marbles or glass batch, preferably in the form of briquetted batch, in a receptacle, usually referred to as a bushing, having orifices at the bottom through which the molten material flows in the form of small streams. The streams are attenuated into fibers by blasts of gas or by mechanical means such as a roating attenuating drum upon which the fibers are wound.

The practical success of these methods, especially the mechanical attenuation method, depends to a great extent upon the continuous and uninterrupted flow of streams of highly uniform molten glass. The glass must also be well fined because even a few small seeds or stones may interrupt the streams when the stones and seeds reach the orifices. Non-uniformities in the temperature of the glass lead both to interruption of the streams and to non-uniform fibers. A drop of less than fifty or one hundred degrees in the temperature of the molten glass at the orifices is evident in coarser fibers attenuated from the streams flowing from the orifices and may also cause breaking of the streams being attenuated.

The problem of maintaining the necessary temperature and control of the flow of the molten material in the container or bushing is aggravated by the fact that where the walls of the bushing are heated to supply heat to the glass, the temperature of the molten material immediately adjacent the bushing walls may be substantially higher than the temperature of portions of the material in the central regions of the bushing. This also causes eddy or circulating currents in vertical directions in the molten glass body, interfering with uniform feed of the molten glass through the bushing. The circulating currents may cause cullet or batch fed into the top of the bushing to sink down toward the orifices before it is completely melted or fined and thus also interfere with free flow of uniform glass from the orifices.

It is an object of this invention to control the flow of molten glass downwardly through the bushing to assure uniform temperature throughout the body of molten glass in the bushing, and to maintain constant temperature of the molten glass flowing from the orifices of the bushing.

It is a further object to maintain uniform feed of the molten glass through the bushing so that each portion of the molten glass remains in the bushing the same length of time, thereby preventing unmelted or incompletely heated cullet, batch or glass from feeding down through the bushing and reaching the orifices.

Another of the objects of this invention is to provide for increased fining of the molten glass as it flows through the bushing; further, for heating the central portions of the material flowing through the bushing; and, further, for effectively decreasing the cross-section of the body of molten glass as it moves through the bushing so that heat applied to the sides of the body is more readily transferred to the interior portions of the body of molten glass.

These objects of the invention are achieved by providing heat distributing members in the form of baffles arranged to direct the molten material transversely of the bushing back and forth from one side to the other of the bushing as it passes therethrough. The baffles not only require a large proportion of the molten material to flow in close relationship with the bushing walls and thus assist heating the glass but, in addition, effectively lengthen the path of molten material through the bushing to increase the fining action, and at the same time transfer heat to the material as it flows transversely of the bushing. As a result, the molten material is uniformly heated to the selected temperature as it flows through the bushing.

Still another object of this invention is to provide a bushing of the type previously set forth having baffles arranged to be heated to transfer heat to the central portions of the material flowing through the bushing, the baffles being supported in the bushing for movement under temperature variations independently of the bushing walls so that the baffles may expand and contract freely without stressing the bushing.

A further object of this invention is to provide a bushing having baffles so arranged as to form pockets at the juncture of the baffles with the bushing walls. These pockets serve to hold and delay passage through the bushing of stones and other unmelted material for a sufficient period of time to insure thoroughly heating and melting the same.

The foregoing, as well as other objects of this invention, will be more apparent as this description proceeds, especially when considered in connection with the accompanying drawing, wherein.

Figure 1:
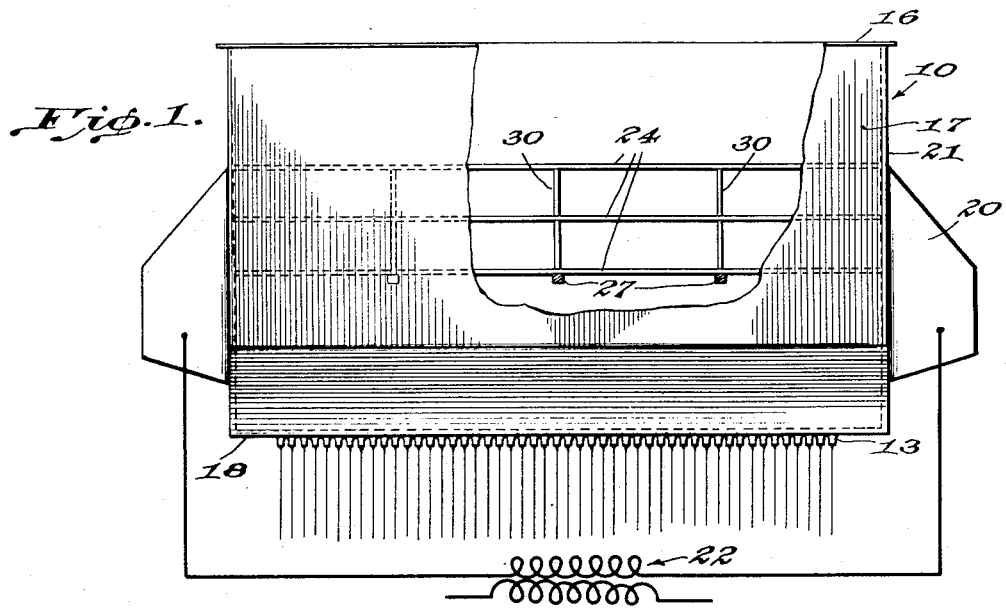
Figure 1 is a side elevational view of a bushing employed in glass fiber manufacturing equipment embodying the present invention, and partly broken away.

The bushing shown at 10 in the drawing is of the general form used in the production of glass fibers and is arranged to feed a plurality of small streams of molten glass. The streams are attenuated to form fibers either by mechanical means such as a winding spool or drum upon which the fibers are wound, or by means of a gaseous blast which is directed onto the streams in the general direction of stream flow. These two methods of attenuating the streams are disclosed more fully in the Slayter and Thomas Patents No. 2,300,736 and No. 2,133,236, respectively.

The bushing is preferably formed of platinum or platinum alloy or other material possessing good electrical conducting characteristics and capable of being heated to a temperature sufficient to convert glass cullet or batch to a molten state by passing electric current therethrough.

Glass cullet usually in the form of marbles, or batch in briquetted form, is introduced into the bushing through the top of the latter from a suitable source of supply and after being melted is discharged through a multiplicity of small orifices 12 formed in the bottom wall of the bushing.

The commercial success of this bushing and associated equipment in producing extremely fine fibers on a production basis with a minimum number of interruptions and failures depends to a great extent on the ability of the bushing to rapidly convert the cullet or batch to molten glass of a high degree of uniformity and to feed the molten glass from the orifices at a constant temperature that is uniform over all the orifices. The present invention accomplishes this with extremely satisfactory results.

As shown in the drawing, the bushing 10 comprises an elongated container rectangular in cross-section and having the opposite side walls 17 tapered inwardly at the lower end of the bushing. The bottom wall 18 is provided with laterally spaced parallel rows of small orifices 12 in nipples 13.

In the present instance the bushing is electrically heated and, for this purpose, a pair of terminals 20 are respectively connected to opposite end walls 21 of the bushing. The terminals 20 enable the bushing to be connected in an electric circuit shown diagrammatically at 22. The electric current passes through the walls of the bushing (and to a minor extent through the molten glass therein) and heats the walls for supplying heat to the glass in the bushing. Other heating means such as gas flames and electrical induction may be employed within the spirit of the invention.

The bushing of the present invention is provided with a plurality of vertically spaced baffles 24 so arranged in the bushing 10 as to compel the molten glass to move along a circuitous passage from one side wall 17 of the bushing to the opposite side 17 of the latter. The baffles are preferably in the form of flat plates of current-conducting, heat-resistant metal similar to that of the bushing walls. The baffle plates may be electrically connected as by welding to the end walls 21 of the bushing, if desired, so that current passes through the baffles and heats the baffles as well as the walls of the bushing. The baffles thus serve the dual purpose of controlling the path of the molten glass, as subsequently described, and of acting as means to heat the molten glass as it flows over the baffles.

As illustrated by the drawing, the baffles are staggered in a vertical plane, that is, alternate baffles are spaced along one of their side edges from opposite side walls of the bushing and each baffle is in substantial contact along the other of its side edges with a side wall of the bushing. Consequently, the path through the bushing is circuitous, extending transversely from side to side of the bushing and is greatly lengthened over what it would be if the material in the bushing were permitted to flow in a straight line from top to bottom of the bushing.

The baffles are spaced apart in a vertical direction distances less than the width of the bushing so that the body of molten glass is narrowed down as it moves through the spaces between the baffles. This facilitates transfer of heat from the baffles to the molten glass. Although the spacing may vary as desired, tests have shown that baffles spaced apart vertically about one-half to one-third the width of the bushing are preferable. The width of the baffles is as great as possible within the limitation that the space between the edge of each baffle and the wall of the bushing must be ample to provide the desired rate of flow of molten glass through the bushing.

Figure 2:
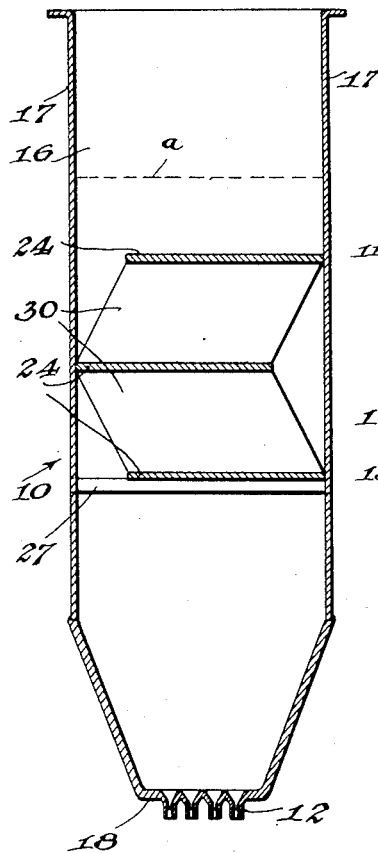
Figure 2 is a cross-sectional view through the bushing shown in Figure 1.

Molten glass in the bushing is ordinarily maintained at a level indicated approximately by the dotted line a in Figure 2. Cullet or batch fed into the bushing maintains this level and as the cullet or batch melts the molten glass passes between the baffles in a path extending from side to side of the bushing. This lengthened path permits fining of the glass, assures complete melting of the cullet or batch and aids in bringing all portions of the melt to a uniform temperature. The baffles also prevent circulating currents in the molten glass that might interfere with feed of all portions of the glass through the bushing at a uniform rate.

The baffles 24 extend for the full length of the bushing and carry heating current and assist materially in heating the molten glass flowing through the bushing. Optimum results are usually obtained with three or four baffles but less or more may be used if found necessary or desirable.

With the baffles secured at their ends as previously mentioned, it has been found desirable to support the lowest baffle intermediate its ends on a plurality of rods 27 extending transversely of the bushing and having their opposite ends respectively secured to the walls 17 of the bushing. The upper baffles 24 are supported by ribs 30 aligned vertically with the rods 27 and secured along their bottom and top edges to the baffle plates. This construction enables the baffles to expand and contract in accordance with temperature changes without placing any stress on the bushing walls. Alternatively the upper baffle plates may be each individually supported on rods similar to the rods 27.

Figure 3:
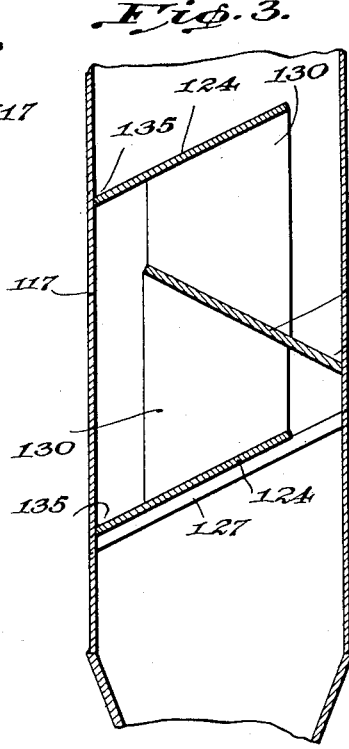
Figure 3 is a view similar to Figure 2 showing a slightly modified form of the bushing.

A modified embodiment of the invention is shown in Figure 3, wherein similar parts are designated by similar reference numerals raised to the series 100. In this form of the invention the baffles 124 are inclined in an upward direction from the bushing walls 117. This construction provides pockets 135 at the juncture of the baffles with the bushing walls which act to catch stones and other unmelted batch, and unmelted cullet and retains such material until it has dissolved or melted. In all other respects this form of the invention functions to control the passage of glass through the bushing in the same manner as the preferred form of the invention.

Figure 4:
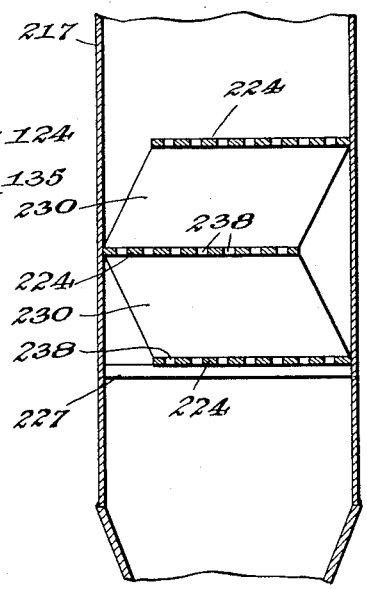
Figure 4 is a view also similar to Figure 2 showing a further modification.

A second modification of the invention is shown in Figure 4. In this view like parts are indicated by similar reference numerals raised to the series 200. This modification comprises baffle plates 224 having a multiplicity of perforations 238 extending through the plates throughout their areas. Molten glass flows through the perforations as well as around the baffles and different portions of the body of molten glass are thus intermixed, thereby aiding in obtaining an increased degree of homogeneity in the glass.

While several embodiments of the present invention have been selected for the purpose of illustration, it is desired that it be understood that numerous other specific constructions may be resorted to for obtaining similar results and reservation is made to make such changes in the constructions as may come within the purview of the accompanying claims.

I claim:

1. Apparatus for melting glass comprising a bushing having a container with walls of high thermal conductivity adapted to be heated to a temperature sufficient to melt glass and having a plurality of discharge orifices at the bottom of the bushing through which molten glass is capable of flowing in the form of streams, and a plurality of vertically spaced baffle plates inclined upwardly from opposite side walls of the bushing and having the free edges spaced from adjacent side walls of the bushing to provide passages for the molten glass.

2. In apparatus for producing glass fibers, a receptacle for melting and feeding glass having side, end and bottom walls and an opening in the top thereof through which glass material is fed into the receptacle, outlet orifices in the bottom wall of the receptacle, and means for controlling the passage of molten glass through the receptacle comprising a plurality of flat strips located below the normal level of glass in the receptacle and extending from end to end of the receptacle, said strips being located in vertically spaced planes with one lengthwise-extending edge of each strip being in substantial contact with a side wall of the receptacle and the opposite edge of each strip being spaced from the other receptacle wall, said strips being staggered vertically, whereby the molten glass flowing through the receptacle is caused to take a circuitous path extending from side to side of the receptacle.

3. In apparatus for producing glass fibers, a container for melting and feeding glass having side, end and bottom walls and an opening in the top thereof through which glass material is fed into the container, said walls of the container being formed of electrical conducting metal and means for passing electric current through the container to heat the glass therein including terminal connections on the end walls of the container, outlet orifices in the bottom wall of the container, and means for controlling the passage of molten glass through the container comprising a plurality of metal strips extending from end to end of the container and secured at their ends to the container ends so that electric current passes through the strips to heat the strips, said strips being located in vertically spaced planes with one lengthwise-extending edge of each strip in contact with a side wall of the container and the opposite edge of each strip being spaced from the other container wall, said strips being staggered vertically, whereby the molten glass flowing through the container is caused to take a circuitous path extending from side to side of the container.

4. In apparatus for producing glass fibers, a container for melting and feeding glass having side, end and bottom walls and an opening in the top thereof through which glass material is fed into the container, said walls of the container being formed of electrical conducting metal and means for passing electric current through the container to heat the glass therein including terminal connections on the end walls of the container, outlet orifices in the bottom wall of the container, and means for controlling the passage of molten glass through the container comprising a plurality of metal strips extending from end to end of the container and secured at their ends to the container ends so that electric current passes through the strips to heat the strips, said strips being located in substantially horizontal vertically spaced planes with one lengthwise-extending edge of each strip in contact with a side wall of the container and the opposite edge of each strip being spaced from the other container wall, said strips being staggered vertically, whereby the molten glass flowing through the container is caused to take a circuitous path extending from side to side thereof.

5. In apparatus for producing glass fibers, a container for melting and feeding glass having side, end and bottom walls and an opening in the top thereof through which glass material is fed into the container, outlet orifices in the bottom wall of the container, and means for controlling the passage of molten glass through the container comprising a plurality of flat metal strips extending from end to end of the container, said strips being located in vertically spaced planes inclined to the horizontal with the lower lengthwise-extending edge of each strip in contact with a side wall of the container and the opposite edge of each strip being spaced from the other container wall, said strips being staggered vertically, whereby the molten glass flowing through the container is caused to take a circuitous path extending from side to side thereof.

6. In apparatus for producing glass fibers, a container for melting and feeding glass having side, end and bottom walls and an opening in the top thereof through which glass material is fed into the container, outlet orifices in the bottom of the container, means for controlling the passage of molten glass through the container comprising a plurality of metal baffle strips extending from end to end of the container, said baffle strips being located in vertically spaced planes, rods extending across the container in supporting relation to the lowest one of said baffle strips and secured at their ends to opposite side walls of the container, and flat plates located between said baffle strips in vertical planes to act as supporting webs for positioning the upper strips from said lowest strip.

7. In apparatus for producing glass fibers, a container for melting and feeding glass having side, end and bottom walls and an opening in the top thereof through which glass material is fed into the container, outlet orifices in the bottom of the container, means for controlling the passage of molten glass through the container comprising a plurality of metal baffle strips extending from end to end of the container, said baffle strips being located in vertically spaced planes with one lengthwise-extending edge of each strip in contact with a side wall of the container and the opposite edge of each strip being spaced from the other container wall, said baffle strips being staggered vertically, whereby the molten glass flowing through the container is caused to take a circuitous path extending from side to side of the container, rods extending across the container in supporting relation to the lowest one of said baffle strips and secured at their ends to opposite side walls of the container, and flat plates located between said baffle strips in vertical planes to act as supporting webs for positioning the upper strips from said lowest strip.

8. In apparatus for producing glass fibers, a container for melting and feeding glass having side, end and bottom walls and an opening in the top thereof through which glass material is fed into the container, outlet orifices in the bottom of the container, means for controlling the passage of molten glass through the container comprising a plurality of metal baffle plates extending from end to end of the bushing, said baffle plates being located in vertically spaced planes with one lengthwise-extending edge of each plate in contact with a side wall of the container and the opposite edge of each plate being spaced from the other container wall, said baffle plates being staggered vertically, whereby the molten glass flowing through the container is caused to take a circuitous path extending from side to side of the container around said baffle plates, and one of said baffle plates being provided with a plurality of perforations extending therethrough, whereby molten glass may flow through the perforate baffle plate to be intermixed with the molten glass flowing around the said perforate plate.

9. In apparatus for forming glass fibers, a container for melting and feeding glass having metallic side, end and bottom walls, said container having outlet orifices in the bottom wall and adapted to be heated electrically to maintain the glass therein in a molten state, which tends to create currents of thermal circulation therein, and means for dispersing said currents in the form of baffles disposed lengthwise of the container in vertically spaced planes and projecting inwardly alternately from opposite side walls of the container, said baffles being located below the normal level of the glass in said container and adapted to cause a transverse flow of glass within the container whereby a high degree of homogeneity of the glass is obtained.

10. In apparatus for producing glass fibers, a container for melting and feeding glass having side, end and bottom walls formed of electrical conducting metal and adapted to be heated by passing an electric current therethrough, said bottom wall provided with outlet openings, and means for controlling the passage of molten glass through the container comprising a plurality of metal strips extending from end to end of the container, said strips being located in vertically spaced planes with one lengthwise-extending edge of each strip being contiguous to a side wall of the container and the opposite edge of each strip being spaced from the other container wall, said strips being staggered vertically, whereby the molten glass flowing through the container is caused to take a circuitous path extending from side to side of the container.

11. In apparatus for forming glass fibers, a container for melting and feeding glass having side, end and bottom walls of heat conducting metal, said container adapted to be heated electrically and provided in its bottom wall with a plurality of discharge outlets, and means for controlling the flow of glass through the container comprising a plurality of baffles disposed in vertically spaced planes and extending from end to end of the container below the normal level of the molten glass, said baffles being arranged alternately adjacent opposite side walls and projecting across the container from one-half to three-quarters of the distance between said side walls of the container whereby said glass is caused to flow transversely of the container to reach said outlets.

RALPH LESTER TIEDE.